United States Patent
Zhang et al.

(10) Patent No.: US 11,403,839 B2
(45) Date of Patent: Aug. 2, 2022

(54) COMMODITY DETECTION TERMINAL, COMMODITY DETECTION METHOD, SYSTEM, COMPUTER DEVICE, AND COMPUTER READABLE MEDIUM

(71) Applicant: BOE TECHNOLOGY GROUP CO., LTD., Beijing (CN)

(72) Inventors: Huanhuan Zhang, Beijing (CN); Tong Liu, Beijing (CN); Yifei Zhang, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 269 days.

(21) Appl. No.: 16/498,750

(22) PCT Filed: Apr. 3, 2019

(86) PCT No.: PCT/CN2019/081309
§ 371 (c)(1),
(2) Date: Sep. 27, 2019

(87) PCT Pub. No.: WO2019/228063
PCT Pub. Date: Dec. 5, 2019

(65) Prior Publication Data
US 2021/0334574 A1    Oct. 28, 2021

(30) Foreign Application Priority Data

May 30, 2018 (CN) .......................... 201810540197.6

(51) Int. Cl.
*G06V 10/00* (2022.01)
*G06V 10/44* (2022.01)
(Continued)

(52) U.S. Cl.
CPC ......... *G06V 10/443* (2022.01); *G06K 9/6218* (2013.01); *G06N 3/08* (2013.01);
(Continued)

(58) Field of Classification Search
CPC .. G06K 9/4609; G06K 9/4671; G06K 9/4652; G06K 9/6218; G06K 9/342; G06T 5/002; G06N 3/08
See application file for complete search history.

(56) References Cited

U.S. PATENT DOCUMENTS

| 10,169,660 B1 * | 1/2019 | Ren .................. G06Q 10/087 |
| 2013/0051667 A1 | 2/2013 | Deng et al. |
| 2016/0171707 A1 * | 6/2016 | Schwartz ............... G06K 9/342 382/180 |

FOREIGN PATENT DOCUMENTS

| CN | 102184405 A * | 9/2011 |
| CN | 102184405 A   | 9/2011 |

(Continued)

OTHER PUBLICATIONS

Pisal et al, Facial Feature Extraction Using Hierarchical MAX(HMAX) Method, 2017 International Conference on Computing, Communication, Control and Automation (ICCUBEA) Aug. 17-18, 2017 pp. 1-5 (Year: 2017).*

(Continued)

*Primary Examiner* — Nancy Bitar
*Assistant Examiner* — Xiao Liu
(74) *Attorney, Agent, or Firm* — Leason Ellis LLP (57) ABSTRACT

A commodity detection terminal is disclosed, the commodity detection terminal includes: an image segmentation unit configured to obtain position information of each grid of a goods shelf in an image of the goods shelf based on a first image, which is an image of the goods shelf not placed with commodities; a detector unit configured to obtain a current
(Continued)

grid where each commodity is located and a current quantity of each commodity based on a second image, which is a current image of the goods shelf placed with commodities; and a determination unit configured to compare the current grid and the current quantity with a preset grid and a preset quantity of the each commodity, so as to determine whether a status of each commodity satisfies a preset condition. A commodity detection method, an intelligent goods shelf system, a computer device, and a readable medium are also disclosed.

18 Claims, 5 Drawing Sheets

(51) Int. Cl.
    *G06K 9/62*     (2022.01)
    *G06N 3/08*     (2006.01)
    *G06T 5/00*     (2006.01)
    *G06V 10/56*     (2022.01)
    *G06V 10/26*     (2022.01)
    *G06V 10/46*     (2022.01)
(52) U.S. Cl.
    CPC ............ *G06T 5/002* (2013.01); *G06V 10/267* (2022.01); *G06V 10/462* (2022.01); *G06V 10/56* (2022.01)

(56) References Cited

FOREIGN PATENT DOCUMENTS

| CN | 106570510 A | * | 4/2017 |
| CN | 106570510 A | | 4/2017 |
| CN | 106658407 A | | 5/2017 |
| CN | 106779729 A | | 5/2017 |
| CN | 107146063 A | | 9/2017 |
| CN | 107516111 A | | 12/2017 |
| CN | 108846401 A | | 11/2018 |

OTHER PUBLICATIONS

Herrera C et al, Joint Depth and Color Camera Calibration with Distortion Correction, IEEE Tr. on Pattern Analysis and Machine Intelligence, vol. 34, No. 10, Oct. 2012, pp. 2058-2064 (Year: 2012).*

Ma et al, An Improved Sobel Algorithm Based on Median Filter, 2010 2nd International Conference on Mechanical and Electronics Engineering, Aug. 1-3, 2010, pp. V1-88-Vi-92 (Year: 2010).*

Li et al., Deconvolution Single Shot MultiBox Detector for Supermarket Commodity Detection and Classification, Proceedings vol. 10420, Ninth International Conference on Digital Image Processing (ICDIP) 2017, pp. 104202R-1-104202R-5 (Year: 2017).*

* cited by examiner

FIG. 14

COMMODITY DETECTION TERMINAL, COMMODITY DETECTION METHOD, SYSTEM, COMPUTER DEVICE, AND COMPUTER READABLE MEDIUM

CROSS-REFERENCE TO RELATED PATENT APPLICATIONS

The present application is a U.S. National Stage Application under 35 U.S.C. § 371 of International Patent Application No. PCT/CN2019/081309, filed Apr. 3, 2019, which claims priority to Chinese patent application No. 201810540197.6, filed on May 30, 2018, both of which are incorporated by reference in their entireties as part of the present application.

TECHNICAL FIELD

Embodiments of the present disclosure relate to a commodity detection terminal, a commodity detection method, a system, a computer device, and a computer readable medium.

BACKGROUND

With the rise of self-service retail supermarkets, how to detect a location where commodity shortage exists and a location where commodity misplacement exists on shelves has become a challenging problem for realizing self-service retail at present. Current mainstream technical means are based on sensor technologies, such as gravity sensors, etc., but the sensors are demanding on operational environment and have a limited service life.

SUMMARY

At least one embodiment of the present disclosure provides a commodity detection terminal, including:
an image segmentation unit configured to obtain position information of each grid of a goods shelf in an image of the goods shelf based on a first image, the first image being an image of the goods shelf when no commodity is placed on the goods shelf;
a detector unit configured to obtain a current grid where each commodity is located and a current quantity of the each commodity based on a second image, the second image being a current image of the goods shelf placed with commodities; and
a determination unit configured to compare the current grid where the each commodity is located and the current quantity of the each commodity with a preset grid and a preset quantity of the each commodity, so as to determine whether a status of the each commodity satisfies a preset condition.

In an embodiment of the present disclosure, the image segmentation unit comprises:
a feature extraction unit configured to convert the first image into a grayscale image, and obtain a feature image based on color channel images extracted and the grayscale image;
an edge detector unit configured to extract edge information and perform edge detection according to the feature image, so as to obtain a binary image; and
a straight line extraction unit configured to extract straight lines according to the binary image and use the straight lines as segmentation lines of the first image.

In an embodiment of the present disclosure, the color channel images comprises: a channel image of a first color, a channel image of a second color, and a channel image of a third color, and
the feature extraction unit comprises a calculator unit, the calculator unit is configured to obtain a differential absolute value image of the grayscale image and one of the color channel images, and obtain a gradient magnitude image of the differential absolute value image, in which the gradient magnitude image is set as the feature image.

In an embodiment of the present disclosure, the first color is red color, the second color is green color, and the third color is blue color, the feature extraction unit is configured to extract a channel image of the red color, and the calculator unit is configured to obtain a differential absolute value image of the grayscale image and the channel image of the red color through calculation, and to obtain a gradient magnitude image of the differential absolute value image of the grayscale image and the channel image of the red color.

In an embodiment of the present disclosure, the grayscale image is configured to be obtained by calculating an effective brightness value of each pixel in the first image; and a formula of the effective brightness value is $Y=0.3R+0.59G+0.11B$, where Y represents a grayscale value of the each pixel, R represents a first color channel value of the each pixel, G represents a second color channel value of the each pixel, and B represents a third color channel value of the each pixel.

In an embodiment of the present disclosure, the image segmentation unit comprises at least one of following units:
a straight line clustering unit configured to cluster the straight lines to obtain a straight line detection result;
a noise processor unit configured to perform a mean filtering process on the first image to remove image noise; and
a distortion correction unit configured to perform image correction on the first image by a checkerboard calibration method.

In an embodiment of the present disclosure, the commodity detection terminal further comprises: a training unit configured to establish a commodity detection model based on a single shot multibox detector (SSD) algorithm, in which the detector unit is configured to perform commodity detection through the commodity detection model.

In an embodiment of the present disclosure, the determination unit comprises:
a commodity misplacement determination unit configured to compare the current grid where the each commodity is located with the preset grid of the each commodity, and to determine that a corresponding commodity is in a commodity misplacement state if a comparison result is that the current grid and the preset grid are inconsistent; and/or,
a commodity shortage determination unit configured to compare the current quantity of the each commodity with a preset critical quantity value of the each commodity, and to determine that a corresponding commodity is in a commodity shortage state if a current quantity of the corresponding commodity is less than a preset critical quantity value of the corresponding commodity.

At least one embodiment of the present disclosure provides a commodity detection method, including:
obtaining position information of each grid of a goods shelf in a first image based on the first image, in which the first image is an image of the goods shelf when no commodity is placed on the goods shelf;
obtaining a current grid where each commodity is located and a current quantity of the each commodity based on a second image, in which the second image is a current image of the goods shelf placed with commodities;

comparing the current grid where the each commodity is located and the current quantity of the each commodity with a preset grid and a preset critical quantity value of the each commodity, so as to determine whether a status of the each commodity satisfies a preset condition.

In one embodiment of the present disclosure, obtaining the position information of the each grid of the goods shelf in the first image based on the first image comprises:

converting the first image into a grayscale image, and obtaining a feature image based on color channel images extracted and the grayscale image;

performing edge detection to extract edge information according to the feature image, so as to obtain a binary image; and extracting straight lines according to the binary image and using the straight lines as segmentation lines of the first image.

In one embodiment of the present disclosure, the color channel images comprises: a channel image of a first color, a channel image of a second color, and a channel image of a third color;

converting the first image into the grayscale image and obtaining the feature image based on the color channel images extracted and the grayscale image comprises: obtaining a differential absolute value image of the grayscale image and one of the color channel images, obtaining a gradient magnitude image of the differential absolute value image, and setting the gradient magnitude image as the feature image.

In one embodiment of the present disclosure, the first color is red color, the second color is green color, and the third color is blue color; and obtaining the feature image based on the color channel images extracted and the grayscale image comprises: extracting a channel image of the red color, obtaining a differential absolute value image of the grayscale image and the channel image of the red color, and obtaining a gradient magnitude image of the differential absolute value image of the grayscale image and the channel image of the red color, and setting the gradient magnitude image of the differential absolute value image of the grayscale image and the channel image of the red color as the feature image.

In one embodiment of the present disclosure, the grayscale image is obtained by calculating an effective brightness value of each pixel in the first image; and a formula of the effective brightness value is: $Y=0.3R+0.59G+0.11B$, where Y represents a grayscale value of the each pixel, R represents a first color channel value of the each pixel, G represents a second color channel value of the each pixel, and B represents a third color channel value of the each pixel.

In one embodiment of the present disclosure, obtaining the position information of the each grid of the goods shelf in the first image based on the first image further comprises at least one of following steps:

clustering the straight lines to obtain a straight line detection result;

performing a mean filtering process on the first image to remove image noise; and performing image correction on the first image by a checkerboard calibration method.

In one embodiment of the present disclosure, the commodity detection method further comprises: establishing a commodity detection model based on a single shot multibox detector (SSD) algorithm, the commodity detection model being applicable to perform commodity detection.

In one embodiment of the present disclosure, comparing the current grid where the each commodity is located and the current quantity of the each commodity with the preset grid and the preset critical quantity value of the each commodity, so as to determine whether the status of the each commodity satisfies the preset condition comprises:

comparing the current grid where the each commodity is located with the preset grid of the each commodity, and determining that a corresponding commodity is in a commodity misplacement state if a comparison result is that the current grid and the preset grid are inconsistent; and/or, comparing the current quantity of the each commodity with the preset critical quantity value of the each commodity, and determining that a corresponding commodity is in a commodity shortage state if a current quantity of the corresponding commodity is less than a preset critical quantity value of the corresponding commodity.

At least one embodiment of the present disclosure provides a computer device, including a memory, a processor, and a computer program stored on the memory and executable by the processor, in which upon the processor executing the computer program, the commodity detection method described above is realized.

At least one embodiment of the present disclosure provides a computer readable medium, storing a computer program, in which upon the computer program being executed by a processor, the commodity detection method described above is realized.

At least one embodiment of the present disclosure provides an intelligent goods shelf system, including:

a goods shelf configured to place objects thereon;

an acquisition module configured to acquire an image of the goods shelf; and a computation module, comprising a memory, a processor, and a computer program stored on the memory and executable by the processor, upon the processor executing the computer program, the commodity detection method described above being realized.

In one embodiment of the present disclosure, the goods shelf comprises a background plate, a first baffle and a second baffle; the background plate, the first baffle and the second baffle are different in color, and the first baffle and the second baffle divide the background plate into a plurality of subregions.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The accompanying drawings show various cross-sectional views according to the embodiments of the present disclosure. It should be understood that the drawings are not necessarily drawn to scale. For the sake of clarity, certain details are enlarged, and certain details may be omitted. Shapes of various regions, layers, and relative size and positional relationship between them are merely exemplary, and may actually be deviated due to manufacturing tolerances or technical limitations, and those skilled in the art can additionally design regions/layers with different shapes, sizes, and relative positions according to actual needs.

Figure 1:
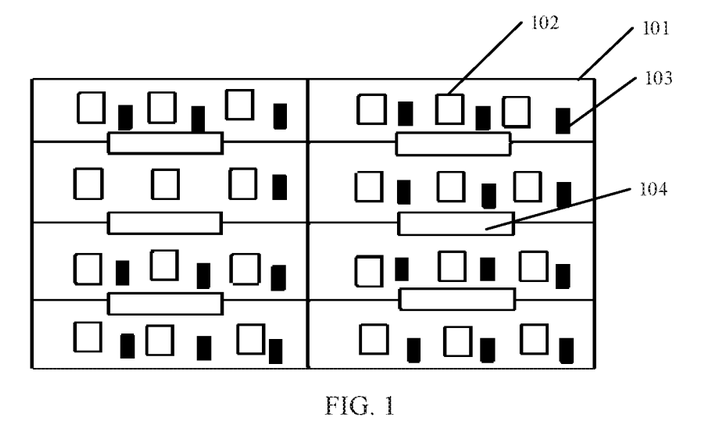
FIG. 1 is a schematic structural diagram of an intelligent goods shelf as known to the inventors.

In recent years, with the rise of artificial intelligence, more and more self-service retail supermarkets have emerged. The self-service retail supermarkets need to update the current status of commodities to determine whether or not each commodity is in a commodity shortage state or in a commodity misplacement state. FIG. 1 illustrates an intelligent goods shelf known to the inventors. The intelligent goods shelf system includes a goods shelf 101 and commodities 102 placed on the goods shelf 101, in which the goods shelf is equipped with a sensing antenna and a radio frequency identification reader/writer 103, each layer of the goods shelf 101 is equipped with a display screen 104, and the commodities 102 are attached with radio frequency identification electronic tags. In order to update the current status of the commodities, it is necessary to manually or automatically scan the radio frequency identification electronic tags on the commodities 102, and it is easy to cause confusion when there are too many commodities.

Figure 2:
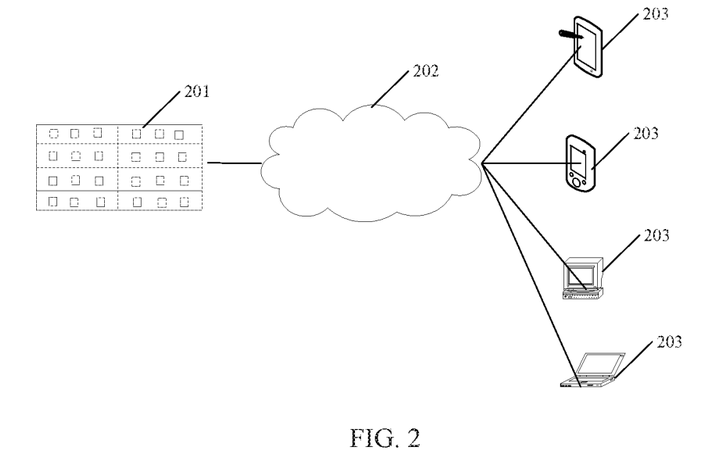
FIG. 2 is a schematic diagram of an architecture of a commodity detection system according to an embodiment of the present disclosure.

FIG. 2 is a schematic diagram of an architecture of a commodity detection system according to at least one embodiment of the present disclosure. The commodity detection system includes a commodity detection terminal 203 and a commodity goods shelf 201. Optionally, the commodity detection system may further include a server 202, etc. For example, in an embodiment of the present disclosure, the commodity detection system further includes a camera for acquiring an image of the commodity goods shelf, and a wireless communication module; the camera acquires the image of the commodity goods shelf and transmits the image to the wireless communication module, the wireless communication module transmits the image to the server, and the server is configured to store relevant comparison data and to compare a received image with the stored comparison data to determine whether the commodity is in a commodity misplacement state or in a commodity shortage state. All the above-mentioned devices can interact with each other and achieve transmitting data and signaling via a communication network, and the communication network includes network node devices such as a network base station and a data exchanging device.

In an embodiment of the present disclosure, a related module having a storage function and a processing function may also be disposed in the commodity detection terminal.

Figure 3:
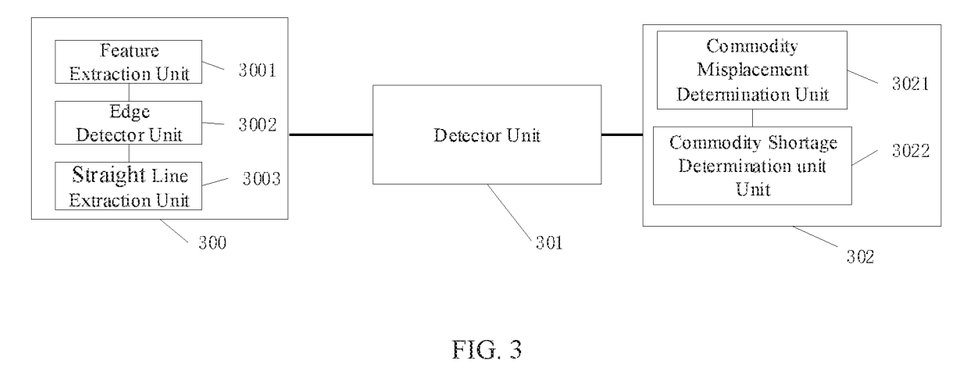
FIG. 3 is a schematic structural diagram of a commodity detection terminal according to an embodiment of the present disclosure.

At least one embodiment of the present disclosure provides a commodity detection terminal, as illustrated in FIG. 3, the commodity detection terminal includes:

an image segmentation unit 300 configured to obtain position information of each grid of a goods shelf in an image of the goods shelf based on a first image, the first image being an image of the goods shelf not placed with commodities;

a detector unit 301 configured to obtain a current grid where each commodity is located and a current quantity of each commodity based on a second image, the second image being a current image of the goods shelf placed with commodities; and a determination unit 302 configured to compare the current grid and the current quantity of each commodity with a preset grid and a preset quantity of the each commodity, so as to determine whether a status of each commodity satisfies a preset condition, in which the preset condition of a commodity includes whether the commodity is in a commodity misplacement state and whether the commodity is in a commodity shortage state.

The second image may be captured by an equipment having an image capturing function, such as a camera, etc. The equipment may be disposed on the goods shelf, or at a position directly opposite to the goods shelf; or the equipment may even be disposed in a room where the goods shelf is placed, monitoring the entire room on the one hand, and acquiring the image of the goods shelf on the other hand.

In the present disclosure, the goods shelf may be a goods shelf having a physical grid structure, that is, a structure with a plurality of grids separated by horizontal baffles and vertical baffles; or, the goods shelf may also be a goods shelf only having structures that are layered. According to the characteristics of the goods shelf, the grid in the present embodiment may be a grid that is separated, or, the grid is a virtually defined grid defined by the commodity arrangement.

It should be noted that the detector unit 301 may obtain the position and quantity information of all commodities in single one detection, or, the detector unit 301 may obtain the position and quantity information of single one commodity in single one detection, for each commodity, and then traverse (perform detection with respect to) all commodities to obtain the positions and quantities of all the commodities, and the embodiments of the present disclosure are not limited thereto.

In one embodiment of the present disclosure, the determination unit 302 may compare the preset grid and the preset quantity of each commodity with the current grid and the current quantity of the each commodity. The preset grid and the preset quantity of each commodity may be stored in a built-in database unit of the terminal. For example, as illustrated in FIG. 3, the determination unit 302 includes:

a commodity misplacement determination unit 3021 configured to compare the current grid where each commodity is located with the preset grid of the each commodity, and to determine that a corresponding commodity is in a commodity misplacement state if a comparison result is that the current grid and the preset grid are inconsistent; and/or, a commodity shortage determination unit 302 configured to compare the current quantity of each commodity with a preset critical quantity value of the each commodity, and to determine that a corresponding commodity is in a commodity shortage state if the current quantity of the corresponding commodity is less than the preset critical quantity value of the corresponding commodity.

The commodity detection terminal according to the embodiments of the present disclosure determines the state of the commodities through a current image of the commodity goods shelf, and the commodity detection terminal does not need additional sensors, radio frequency identification tags, etc., thereby having a relatively low cost, simple operation and low error rate.

At least one embodiment of the present disclosure provides an image segmentation unit based on the principle of three primary colors. As illustrated in FIG. 3, the image segmentation unit 300 includes:

a feature extraction unit 3001 configured to convert the first image into a grayscale image, and obtain a feature image based on the grayscale image and color channel images being extracted, in which the first image is an image of the goods shelf not placed with commodities;

an edge detector unit 3002 configured to extract edge information and perform edge detection, according to the feature image; and a straight line extraction unit configured to extract straight lines based on a binary image obtained by the edge detection, and use the straight lines as segmentation lines of the first image.

The color channel images includes: a channel image of a first color, a channel image of a second color, and a channel image of a third color. For example, the first color is red, the second color is green, and the third color is blue. The channel image of the first color represents brightness values of red pixels in the first image, the channel image of the second color represents brightness values of green pixels in the first image, and the channel image of the third color represents brightness values of blue pixels in the first image.

The feature extraction unit 3001 includes: a calculator unit configured to obtain a differential absolute value image of the grayscale image and one of the color channel images through calculation, and to obtain a gradient magnitude image of the differential absolute value image through calculation, in which the gradient magnitude image is the feature image outputted by the feature extraction unit. Taking red color as an example, the feature extraction unit extracts a channel image of the red color, and the calculator unit calculates a differential absolute value image of the grayscale image and the channel image of the red color, in which the width and height of the differential absolute value image are the same as the width and height of the grayscale image and the width and height of the channel image of the red color. In the differential absolute value image, a pixel value of each pixel point is an absolute value of a difference between a pixel value of the grayscale image at the pixel point and a pixel value of the channel image of the red color at the pixel point. The above-mentioned description is also applicable to a channel image of the green color and a channel image of the blue color. Converting a color image to a grayscale image requires calculating an effective brightness value of each pixel in the image, and a calculation formula thereof is: $Y=0.3R+0.59G+0.11B$; where R represents a red color channel value of the pixel, G represents a green color channel value of the pixel, B represents a blue color channel value of the pixel, and Y represents a grayscale value of the pixel.

The present embodiment perform image segmentation on the acquired image based on the principle of three primary colors, thereby segmenting the goods shelf. Compared with the image segmentation method known to the inventors, the image segmentation on the acquired image based on the principle of three primary colors is advantageous for highlighting the edge features of color changes, especially applicable for color images with obvious color difference, thereby improving the accuracy of image segmentation.

The image segmentation unit according to the embodiments of the present disclosure can also be separately applied in the segmentation of any image, which should not be limited to be applied in the commodity detection described in the present disclosure. For example, in some feasible embodiments, the image segmentation unit can be configured as a stand-alone device that can be separately in signal communication with a server and/or an image acquisition module. In these feasible embodiments, the image segmentation unit can improve the segmentation accuracy of color images.

Figure 4:
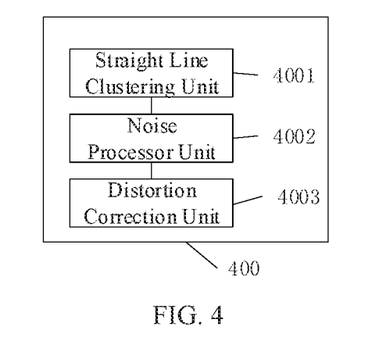
FIG. 4 is a schematic structural diagram of an image segmentation unit in a commodity detection terminal according to an embodiment of the present disclosure.

Further, in order to improve the accuracy of image segmentation, as illustrated in FIG. 4, the image segmentation unit 400 may include at least one of the following units:

a straight line clustering unit 4001 configured to cluster the straight lines to obtain a straight line detection result;

a noise processor unit 4002 configured to perform a mean filtering process on the first image to remove image noise; and a distortion correction unit 4003 configured to perform image correction on the first image by adopting a checkerboard calibration method.

Figure 5:
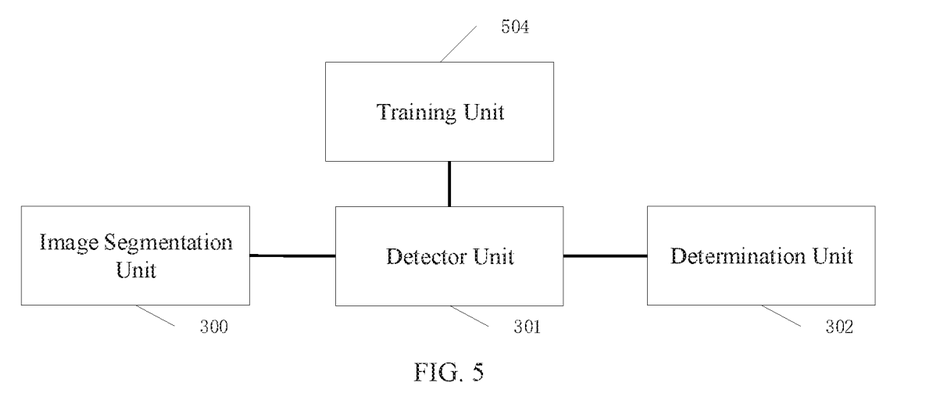
FIG. 5 is a schematic structural diagram of a commodity detection terminal according to another embodiment of the present disclosure.

In an embodiment of the present disclosure, referring to FIG. 5, the commodity detection terminal further includes: a training unit 504 configured to establish a commodity detection model based on an SSD algorithm.

In the present embodiment, the detector unit accelerates the detection speed based on a commodity detection model, including a commodity data set, established based on a deep learning based convolutional neural network.

It is apparent to those skilled in the art that a convolutional neural network is a multi-layered neural network that is good at processing images, especially machine learning related to a large number of images. The convolutional network reduces the dimensionality of image recognition problem involving huge data volume through a series of methods, and finally enable it to be trained.

The single shot multibox detector (SSD) algorithm is a known detection algorithm. It is well known in the art that the core of the SSD is to use convolution kernels on the feature map to predict the category scores and offsets of a series of default bounding boxes. The SSD is a method that makes use of the ideas of the deep learning-based target detection algorithm YOLO (You Only Look Once) and Faster R-CNN, and the SSD have a fast target detection speed and a high target detection accuracy.

Figure 6:
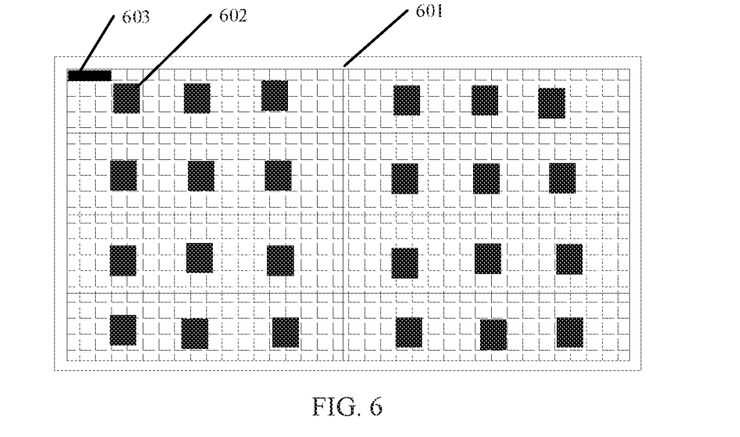
FIG. 6 is a schematic diagram of grids of an SSD algorithm according to an embodiment of the present disclosure.

The convolution is described in detail below with reference to the embodiment as illustrated in FIG. 6. In the present embodiment, a 3×1 kernel is preset, and the kernel includes three small squares, each of which contains a corresponding number or function relationship. In FIG. 6, a total of N kernels can be formed, and by performing a convolution operation on the image of the goods shelf (which can be understood as providing a sliding window, multiplying the kernel with corresponding image pixels and then summing), a 3×1 convolution result is obtained. This process can be understood as that we use a filter (kernel) to filter the small regions of the image, so as to obtain the characteristic values of these small regions.

In implementation, a plurality of kernels are usually used. It can be considered that each kernel represents an image mode. And if a value obtained through convolution of an image patch and a kernel is large, the image patch is considered to be very close to the kernel. For example, in some feasible embodiments, six kernels are included, and it can be understood that there are six underlying texture modes on the images of the present embodiment, that is, one image can be depicted by six basic modes.

In an actual training process, values of the kernels are obtained during a learning process. Through continuous deep learning, a commodity detection model having the fastest detection speed and the highest accuracy for the commodity detection of a certain goods shelf is formed. The commodity detection model includes at least one corresponding kernel; other corresponding function relationships, etc., which are not repeatedly described in the present disclosure.

Figure 7:
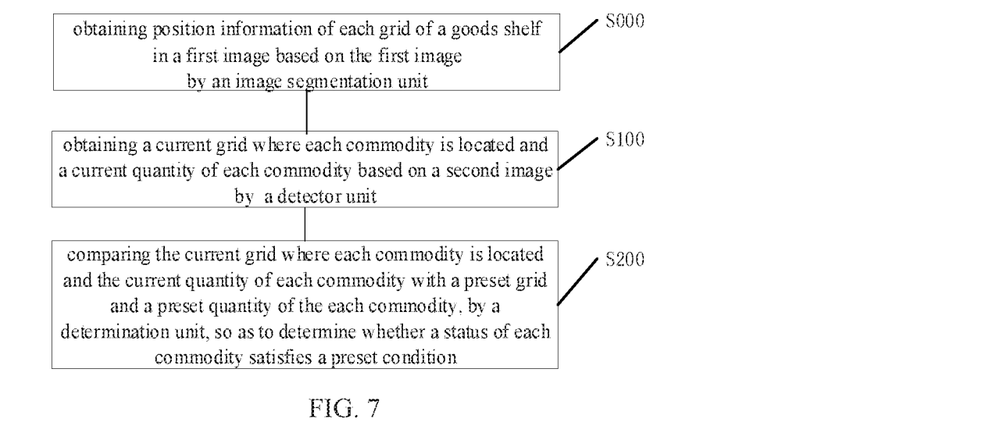
FIG. 7 is a schematic flowchart of a commodity detection method according to an embodiment of the present disclosure.

At least one embodiment of the present disclosure provides a commodity detection method, as illustrated in FIG. 7, the commodity detection method includes:

S000, obtaining, by an image segmentation unit, position information of each grid of a goods shelf in a first image based on the first image, in which the first image is an image of the goods shelf not placed with commodities;

S100, obtaining, by a detector unit, a current grid where each commodity is located and a current quantity of each commodity based on a second image, in which the second image is a current image of the goods shelf placed with the commodities;

S200, comparing, by a determination unit, the current grid and the current quantity of each commodity with a preset grid and a preset quantity of the each commodity so as to determine whether a status of each commodity satisfies a preset condition.

In some embodiments of the present disclosure, the first image and the second image may be obtained by an equipment having an image capturing function, and details are not described herein again.

In an embodiment of the present disclosure, the determination unit may compare the current grid and the current quantity of the commodity with a preset grid and a preset quantity of the commodity stored in the commodity detection terminal. The preset grid and the preset quantity of the commodity can be a priori information inputted in a database unit in advance, or can also be information obtained by performing image analysis on an image acquired when the goods shelf is fully placed with commodities for the first time.

Figure 8:
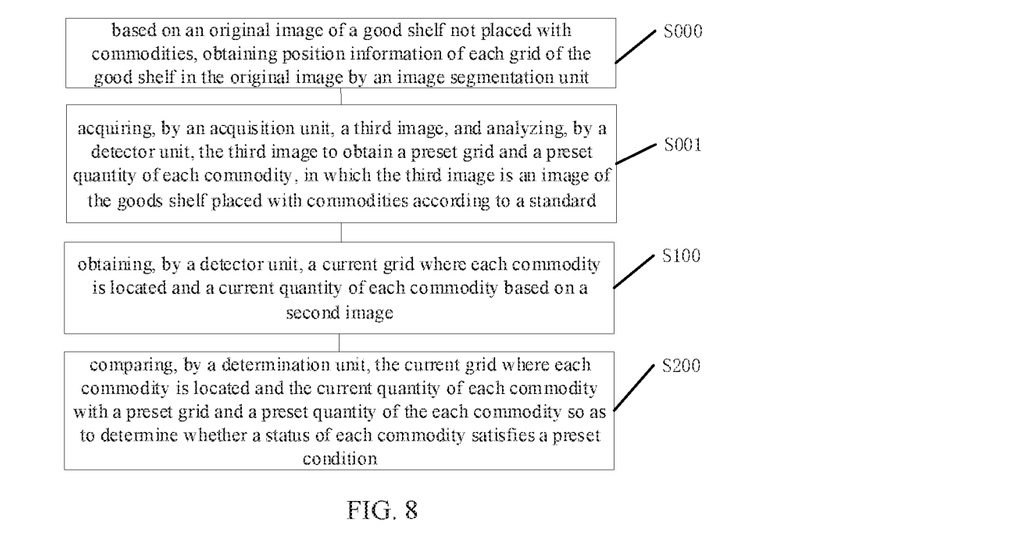
FIG. 8 is a schematic flowchart of a commodity detection method according to another embodiment of the present disclosure.

For example, as illustrated in FIG. 8, in an optional embodiment, the commodity detection method further includes:

S001, acquiring, by an acquisition unit, a third image, and analyzing, by a detector unit, the third image to obtain a preset grid and a preset quantity of each commodity, in which the third image is an image of the goods shelf placed with commodities according to a standard.

In the present embodiment, the image segmentation unit is capable of dividing regions according to the characteristics of the goods shelf or the arrangement of commodities, and locating the certain region where each commodity is placed, thereby binding a position on the goods shelf to a commodity type.

Figure 9:
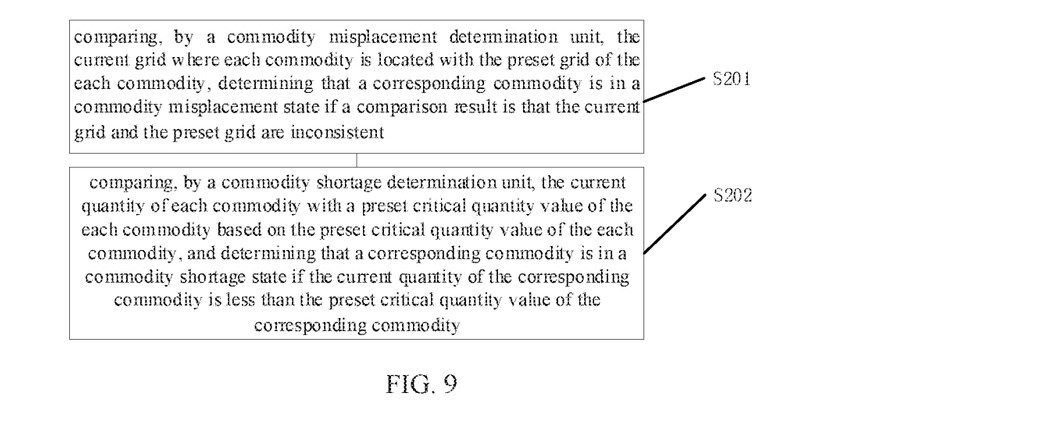
FIG. 9 is a schematic flowchart of the step S200 as illustrated in FIG. 7.

In an embodiment of the present disclosure, as illustrated in FIG. 9, comparing of the current grid and the current quantity of each commodity with the preset grid and the preset quantity of the each commodity by the determination unit, so as to determine whether the status of each commodity satisfies a preset condition includes:

S201: comparing, by a commodity misplacement determination unit, the current grid where each commodity is located with the preset grid of the each commodity, determining that a corresponding commodity is in a commodity misplacement state if a comparison result is that the current grid and the preset grid are inconsistent; and/or, S202: comparing, by a commodity shortage determination unit, the current quantity of each commodity with a preset critical quantity value of the each commodity based on the preset critical quantity value of the each commodity, and determining that a corresponding commodity is in a commodity shortage state if the current quantity of the corresponding commodity is less than the preset critical quantity value of the corresponding commodity.

In the commodity detection method according to the embodiments of the present disclosure, the status of the commodity is determined based on a second image (an image of the goods shelf placed with the commodities), and no additional sensor, radio frequency identification tag, or the like is required, thereby having a relatively low cost, simple operation and low error rate.

Figure 10:
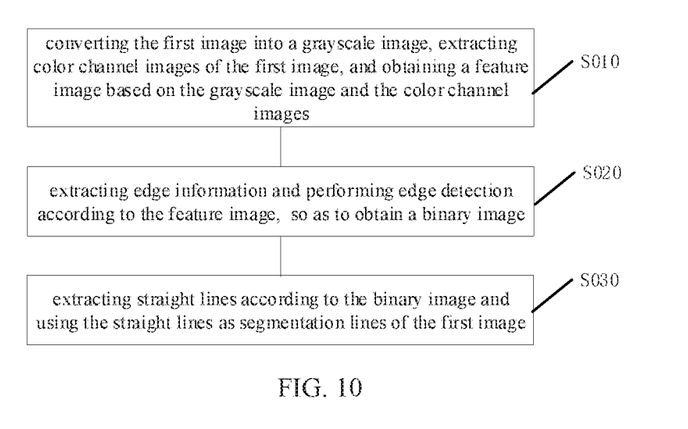
FIG. 10 is a schematic flowchart of the step S000 as illustrated in FIG. 8.

At least one embodiment of the present disclosure provides an image segmentation method based on the principle of three primary colors. As illustrated in FIG. 10, obtaining of the position information of each grid of the goods shelf in the first image based on the first image (i.e., an image of the goods shelf not placed with commodities), includes:

S010: converting the first image into a grayscale image, extracting color channel images of the first image, and obtaining a feature image based on the grayscale image and the color channel images;

S020: extracting edge information and performing edge detection according to the feature image, so as to obtain a binary image; and S030: extracting straight lines according to the binary image and using the straight lines as segmentation lines of the first image.

The first image is an image of the goods shelf not placed with commodities. The color channel images includes: a channel image of a first color, a channel image of a second color, and a channel image of a third color. In an embodiment of the present disclosure, the step S010 includes:

S011: calculating a differential absolute value image of the grayscale image and one of the color channel images, obtaining a gradient magnitude image of the differential absolute value image through calculation, and using the gradient magnitude image as the feature image.

For calculating an effective brightness value of each pixel in the first image, to convert the first image into a grayscale image, a calculation formula thereof is: Y=0.3R+0.59G+ 0.11B; where R represents a red color channel value of the pixel, G represents a green color channel value of the pixel, B represents a blue color channel value of the pixel, and Y represents a grayscale value of the pixel.

In the present embodiment, based on the principle of three primary colors, an image segmentation is performed on the acquired image, thereby segmenting the goods shelf. This method is advantageous for highlighting the edge features of color changes, and applicable for color images with obvious color difference, thereby improving the accuracy of image segmentation.

Of course, the image segmentation unit according to the embodiments of the present disclosure can be applied in the segmentation of any image, which should not be limited to be applied in the commodity detection described in the present disclosure. That is, the image segmentation method according to the embodiments of the present disclosure can be substantially independent from the commodity detection method or the commodity detection system according to the present disclosure, and be implemented separately. In some feasible embodiments, the image segmentation unit can at least improve the segmentation accuracy of color images.

Figure 11:
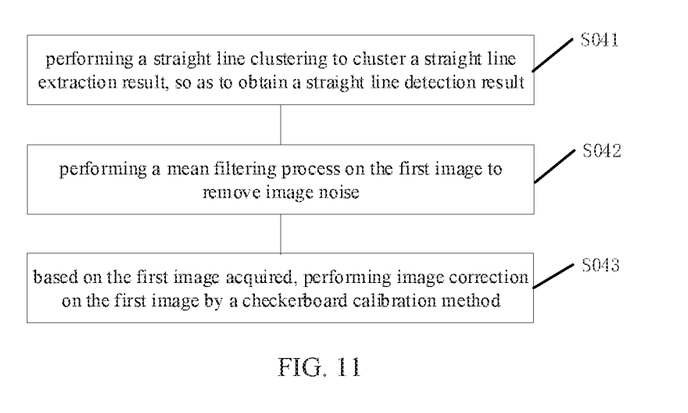
FIG. 11 is another flowchart of the step S000 as illustrated in FIG. 8.

Further, in order to improve the accuracy of image segmentation, as illustrated in FIG. 11, the image segmentation method includes at least one of the following steps:

S041: performing a straight line clustering to cluster a straight line extraction result, so as to obtain a straight line detection result;

S042: performing a mean filtering process on the first image to remove image noise; and S043: performing image correction on the first image acquired by a checkerboard calibration method based on the first image acquired.

In an embodiment of the present disclosure, the straight line clustering includes:

a) with respect to the straight line extraction result, firstly, establishing a matrix regarding the intersection states of the straight lines in the image. Assuming N straight lines are in the image, an N-dimensional square matrix is established. A value of an element, which is in the i-th row and the j-th column of the square matrix, of the square matrix represents the intersection state of the i-th line and the j-th line. The value being equal to zero means that two lines intersect at a position which is at the outside of the image, the value being equal to one means that two lines intersect at a position within the image, and the value being equal to two means that two lines are parallel;

b) extracting the angle between each straight line of the straight line extraction result and the horizontal axis of the image coordinates;

c) extracting the vertical distance between the coordinate origin of the image to each straight line of the straight line extraction result;

d) taking a line whose number is i from the straight line extraction result, and taking an unmerged line whose number is j from the straight line extraction result; performing no processing if the line j and the line i do not intersect at a position within the image; obtaining a distance difference between a distance from the image coordinate origin to the straight line j and a distance from the image coordinate origin to the straight line i if the line j is parallel to the line i, and storing the coordinate values of the points on the straight line j if the distance difference is less than a certain threshold value; obtaining an angle difference between an angle between the straight line j and the horizontal axis of the image coordinates and an angle between the straight line i and the horizontal axis of the image coordinates if the straight line j and the straight line i intersect at a position within the image, and storing the coordinate values of the points on the straight line j if the angle difference is less than a certain threshold value; marking the straight line j as merged.

e) repeating step d to compare all unmerged straight lines in the straight line extraction result with the straight line i sequentially;

f) if there is a straight line in the straight line extraction result that needs to be merged with the straight line i, performing a linear fitting on the straight line i and all the points on all the straight lines to be merged;

g) repeating steps d-f to complete clustering of all straight lines in the straight line extraction result, so as to obtain the final straight line detection result.

Performing a straight line clustering on the acquired image can improve the accuracy of image detection.

Performing of a mean filtering process on the first image, to remove image noise, can allow the image segmentation method to be suitable for an environment with a weak illumination condition and high noise.

When a camera captures an image, a distortion always exists. The distortions of different cameras are different. The distortions of some cameras are negligible, but the distortion of a device with a wide-angle lens is large, and if the distortion of the device with the wide-angle lens is ignored, the error can be large. Therefore, when an acquisition device is equipped with a wide-angle lens, it is necessary to perform image correction by adopting a checkerboard calibration method.

Moreover, in an embodiment of the present disclosure, the method further includes:

S050: establishing a commodity detection model based on an SSD algorithm; in which the commodity detection model is applicable to perform commodity detection.

In some embodiments, the SSD algorithm can adjust the learning rate, or can crop an input image into a plurality of fixed sizes for training.

Figure 12:
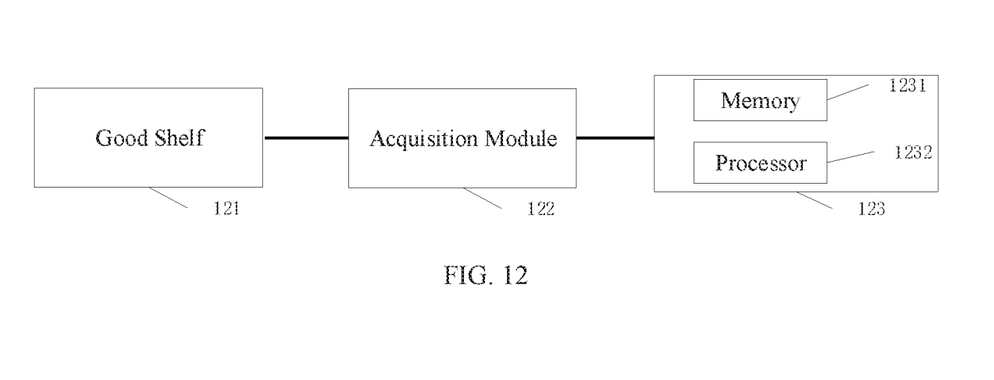
FIG. 12 is a schematic structural diagram of a commodity detection system according to an embodiment of the present disclosure.

At least one embodiment of the present disclosure provides an intelligent goods shelf system. As illustrated in FIG. 12, in a feasible goods shelf commodity detection system, the system includes: a goods shelf 121 configured to place objects thereon, for example, in which the objects include but are not limited to commodities; an acquisition module 122 configured to acquire an image of the goods shelf; and a computation module 123 including a memory 1231, a processor 1232, and a computer program stored on the memory 1231 and executable by the processor 1232, upon the processor executing the computer program, the commodity detection method described above being realized.

Figure 13:
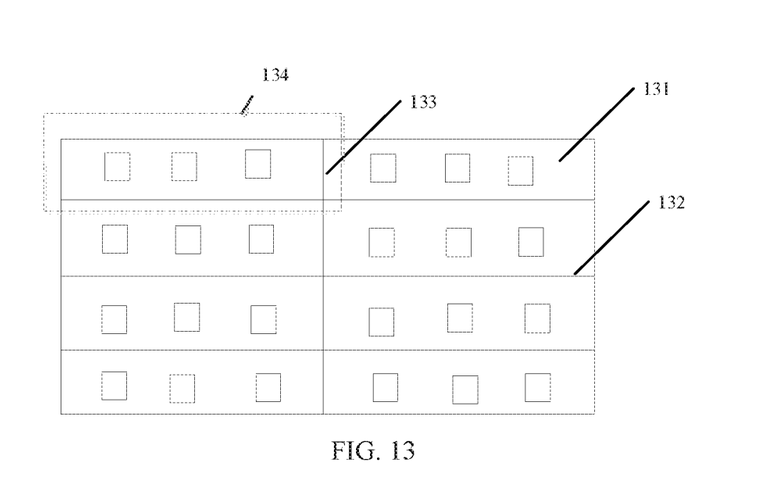
FIG. 13 is a schematic structural diagram of a goods shelf as illustrated in FIG. 12.

Because the above-mentioned embodiments obtain subregion information of commodities by adopting an image segmentation method, when the color of the goods shelf has a certain degree of discrimination, the edge features to be extracted are obvious, and the image detection accuracy is high. The greater the difference in color between the subregions of the goods shelf, the greater the difference in brightness values, and the higher the accuracy of image detection. For example, in an embodiment of the present disclosure, as illustrated in FIG. 13, the goods shelf includes a background plate 131, a first baffle 132 and a second baffle 133; in which the background plate 131 is white, the first baffle is green, the second baffle is blue, and the first baffle 132 and the second baffle 133 divide the background plate 131 into a plurality of subregions 134.

Further, at least one embodiment of the present disclosure provides a computer device, including a memory, a processor, and a computer program stored on the memory and executable by the processor, upon the processor executing the computer program, the commodity detection method described above, or the methods performed by the image segmentation unit, the commodity detection terminal, or the commodity detection system according to some embodiments of the present disclosure, being realized.

Figure 14:
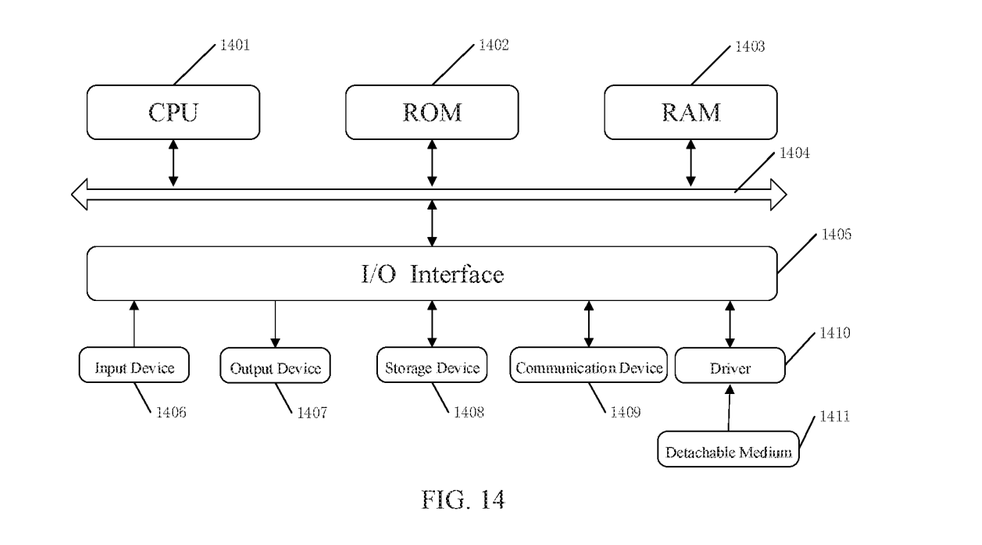
FIG. 14 is a schematic structural diagram of a computer device suitable for implementing a terminal device or a server according to at least one embodiment of the present disclosure.

FIG. 14 is a schematic structural diagram of a computer device suitable for implementing the commodity detection terminal or the commodity detection system according to the embodiments of the present disclosure.

As illustrated in FIG. 14, the computer device 1400 includes a central processing unit (CPU) 1401 that is configured to perform processing in accordance with a program stored in a read only memory (ROM) 1402 or a program loaded into a random access memory (RAM) 1403 from a storage device 1408. In the RAM 1403, programs and data required for the operation of the computer device 1400 are also stored. The CPU 1401, the ROM 1402, and the RAM 1403 are connected to each other through a bus 1404. An input/output (I/O) interface 1405 is also connected to the bus 1404.

The computer device 1400 further includes: an input device 1406, such as a keyboard, a mouse, etc.; an output device 1407, which is, for example, a display device such as a cathode ray tube (CRT), a liquid crystal display (LCD) and a loudspeaker, etc.; a storage device 1408, such as a hard disk, etc.; a communication device 1409, such as a LAN card, a modem, etc.; a driver 1410; and detachable medium 1411, such as a magnetic disk, an optical disk, a magneto-optical disk, a semiconductor memory, etc. The above-mentioned devices are all connected to the bus 1404 via the input/output (I/O) interface 1405. The communication device 1409 communicates via, for example, the Internet. The detachable medium 1411 is installed on the driver 1410 as needed, so that a computer program read from the detachable medium 1411 can be installed as needed, just like the storage device 1408.

According to the embodiments of the present disclosure, the method described above with reference to the flowcharts can be implemented as a computer software program. Further, at least one embodiment of the present disclosure provides a computer program product including a computer program tangibly embodied on a machine readable medium, the computer program including program codes for executing the method illustrated in the flowchart. In the present embodiment, the computer program can be downloaded from the network via the communication device 1409 and installed, and/or installed from the detachable medium 1411.

The flowcharts and block diagrams in the accompanying drawings illustrate the architectures, functionalities, and operations of possible implementations of the commodity detection system, the commodity detection method, and the computer program product according to the embodiments of the present disclosure. In this regard, each block of the flowcharts or block diagrams can represent a module, a program segment, or a portion of code, and the module, the program segment, or the portion of code includes one or more executable instructions for implementing a specified logic function. It should also be noted that in some alternative implementations, the functions illustrated in the blocks may also be transmitted in an order different from the order annotated in the drawings. For example, two successively represented blocks may in fact be executed substantially in parallel, and sometimes, they may be executed in a reverse order, depending on the functions involved. It should also be noted that each block of the block diagrams and/or flowcharts, and any combination of blocks in the block diagrams and/or flowcharts, can be implemented by a dedicated hardware-based system that performs the specified functions or operations, or can be implemented by a combination of a dedicated hardware and computer instructions.

What are described above is related to the illustrative embodiments of the disclosure only and not limitative to the scope of the disclosure; the scopes of the disclosure are defined by the accompanying claims.

What is claimed is:

1. A commodity detection terminal, comprising:
an image segmentation unit configured to obtain position information of each grid of a goods shelf in an image of the goods shelf based on a first image, the first image being an image of the goods shelf when no commodity is placed on the each grid of the goods shelf;
a detector unit configured to obtain a current grid where each commodity is located and a current quantity of the each commodity based on a second image, the second image being a current image of the goods shelf placed with commodities; and
a determination unit configured to compare the current grid where the each commodity is located and the current quantity of the each commodity with a preset grid and a preset quantity of the each commodity, so as to determine whether a status of the each commodity satisfies a preset condition,
wherein the determination unit comprises:
a commodity misplacement determination unit configured to compare the current grid where the each commodity is located with the preset grid of the each commodity, and to determine that a corresponding commodity is in a commodity misplacement state if a comparison result is that the current grid and the preset grid are inconsistent; and/or,
a commodity shortage determination unit configured to compare the current quantity of the each commodity with a preset critical quantity value of the each commodity, and to determine that a corresponding commodity is in a commodity shortage state if a current quantity of the corresponding commodity is less than a preset critical quantity value of the corresponding commodity.

2. The commodity detection terminal according to claim 1, wherein the image segmentation unit comprises:
a feature extraction unit configured to convert the first image into a gray scale image, and obtain a feature image based on color channel images extracted and the grayscale image;
an edge detector unit configured to extract edge information and perform edge detection according to the feature image, so as to obtain a binary image; and
a straight line extraction unit configured to extract straight lines according to the binary image and use the straight lines as segmentation lines of the first image.

3. The commodity detection terminal according to claim 2, wherein the color channel images comprises: a channel image of a first color, a channel image of a second color, and a channel image of a third color; and
the feature extraction unit comprises a calculator unit, the calculator unit is configured to obtain a differential absolute value image of the grayscale image and one of the color channel images, and obtain a gradient magnitude image of the differential absolute value image, wherein the gradient magnitude image is set as the feature image.

4. The commodity detection terminal according to claim 3, wherein the grayscale image is configured to be obtained by calculating an effective brightness value of each pixel in the first image; and
a formula of the effective brightness value is $Y=0.3R+0.59G+0.11B$,
where Y represents a grayscale value of the each pixel, R represents a first color channel value of the each pixel, G represents a second color channel value of the each pixel, and B represents a third color channel value of the each pixel.

5. The commodity detection terminal according to claim 3, wherein the first color is red color, the second color is green color, and the third color is blue color;
the feature extraction unit is configured to extract a channel image of the red color; and
the calculator unit is configured to obtain a differential absolute value image of the grayscale image and the channel image of the red color through calculation, and to obtain a gradient magnitude image of the differential absolute value image of the grayscale image and the channel image of the red color.

6. The commodity detection terminal according to claim 2, wherein the image segmentation unit comprises at least one of following units:
a straight line clustering unit configured to cluster the straight lines to obtain a straight line detection result;
a noise processor unit configured to perform a mean filtering process on the first image to remove image noise; and
a distortion correction unit configured to perform image correction on the first image by a checkerboard calibration method.

7. The commodity detection terminal according to claim 1, further comprising:
a training unit configured to establish a commodity detection model based on a single shot multibox detector (SSD) algorithm,
wherein the detector unit is configured to perform commodity detection through the commodity detection model.

8. A commodity detection method, comprising:
obtaining position information of each grid of a goods shelf in a first image based on the first image, wherein the first image is an image of the goods shelf when no commodity is placed on the each grid of the goods shelf;
obtaining a current grid where each commodity is located and a current quantity of the each commodity based on a second image, wherein the second image is a current image of the goods shelf placed with commodities; and
comparing the current grid where the each commodity is located and the current quantity of the each commodity with a preset grid and a preset critical quantity value of the each commodity, so as to determine whether a status of the each commodity satisfies a preset condition,
wherein the comparing the current grid where the each commodity is located and the current quantity of the each commodity with the preset grid and the preset critical quantity value of the each commodity, so as to determine whether the status of the each commodity satisfies the preset condition comprises:
comparing the current grid where the each commodity is located with the preset grid of the each commodity, and determining that a corresponding commodity is in a commodity misplacement state if a comparison result is that the current grid and the preset grid are inconsistent; and/or,
comparing the current quantity of the each commodity with the preset critical quantity value of the each commodity, and determining that a corresponding commodity is in a commodity shortage state if a current quantity of the corresponding commodity is less than a preset critical quantity value of the corresponding commodity.

9. The commodity detection method according to claim 8, wherein obtaining the position information of the each grid of the goods shelf in the first image based on the first image comprises:
converting the first image into a grayscale image, and obtaining a feature image based on color channel images extracted and the grayscale image;
performing edge detection to extract edge information according to the feature image, so as to obtain a binary image; and
extracting straight lines according to the binary image and using the straight lines as segmentation lines of the first image.

10. The commodity detection method according to claim 9, wherein the color channel images comprises: a channel image of a first color, a channel image of a second color, and a channel image of a third color;
converting the first image into the grayscale image and obtaining the feature image based on the color channel images extracted and the grayscale image comprises:
obtaining a differential absolute value image of the grayscale image and one of the color channel images, obtaining a gradient magnitude image of the differential absolute value image, and setting the gradient magnitude image as the feature image.

11. The commodity detection method according to claim 10, wherein the first color is red color, the second color is green color, and the third color is blue color; and
obtaining the feature image based on the color channel images extracted and the grayscale image comprises:
extracting a channel image of the red color,
obtaining a differential absolute value image of the grayscale image and the channel image of the red color, and obtaining a gradient magnitude image of the differential absolute value image of the grayscale image and the channel image of the red color, and
setting the gradient magnitude image of the differential absolute value image of the grayscale image and the channel image of the red color as the feature image.

12. The commodity detection method according to claim 9, wherein the grayscale image is obtained by calculating an effective brightness value of each pixel in the first image; and
a formula of the effective brightness value is: $Y=0.3R+0.59G+0.11B$,
where Y represents a grayscale value of the each pixel, R represents a first color channel value of the each pixel, G represents a second color channel value of the each pixel, and B represents a third color channel value of the each pixel.

13. The commodity detection method according to claim 9, wherein obtaining the position information of the each grid of the goods shelf in the first image based on the first image further comprises at least one of following steps:

clustering the straight lines to obtain a straight line detection result;

performing a mean filtering process on the first image to remove image noise; and performing image correction on the first image by a checkerboard calibration method.

14. The commodity detection method according to claim 8, further comprising:

establishing a commodity detection model based on a single shot multibox detector (SSD) algorithm, the commodity detection model being applicable to perform commodity detection.

15. A computer device, comprising a memory, a processor, and a computer program stored on the memory and executable by the processor, wherein, upon the processor executing the computer program, the commodity detection method according to claim 8 is realized.

16. A computer readable medium, storing a computer program, wherein, upon the computer program being executed by a processor, the commodity detection method according to claim 8 is realized.

17. An intelligent goods shelf system, comprising:

a goods shelf configured to place objects thereon;

an acquisition module configured to acquire an image of the goods shelf; and a computation module, comprising a memory, a processor, and a computer program stored on the memory and executable by the processor, upon the processor executing the computer program, the commodity detection method according to claim 8 being realized.

18. The intelligent goods shelf system according claim 17, wherein the goods shelf comprises a background plate, a first baffle and a second baffle;

the background plate, the first baffle and the second baffle are different in color, and the first baffle and the second baffle divide the background plate into a plurality of subregions.

* * * * *